(12) United States Patent
Galloway

(10) Patent No.: US 10,749,679 B2
(45) Date of Patent: Aug. 18, 2020

(54) AUTHENTICATION AND AUTHORIZATION USING TOKENS WITH ACTION IDENTIFICATION

(71) Applicant: Neopost Technologies, Bagneux (FR)

(72) Inventor: Jacob Galloway, Chicago, IL (US)

(73) Assignee: Neopost Technologies, Bagneux (FR)

( * ) Notice: Subject to any disclaimer, the term of this patent is extended or adjusted under 35 U.S.C. 154(b) by 176 days.

(21) Appl. No.: 15/877,631

(22) Filed: Jan. 23, 2018

(65) Prior Publication Data

US 2019/0229922 A1    Jul. 25, 2019

(51) Int. Cl.
*H04L 9/00*    (2006.01)
*H04L 9/32*    (2006.01)
*G06F 21/44*    (2013.01)
*G06F 21/62*    (2013.01)

(52) U.S. Cl.
CPC ............ *H04L 9/3226* (2013.01); *G06F 21/44* (2013.01); *G06F 21/6218* (2013.01); *G06F 2221/2115* (2013.01)

(58) Field of Classification Search
CPC ..................................................... H04L 9/3226
See application file for complete search history.

(56) References Cited

U.S. PATENT DOCUMENTS

| 7,865,931 B1 | 1/2011 | Stone et al. |
| 8,336,078 B2 | 12/2012 | Dixit et al. |
| 2007/0214497 A1 | 9/2007 | Montgomery et al. |
| 2011/0023096 A1* | 1/2011 | Xiao .................... H04L 63/0236 726/5 |
| 2018/0025332 A1* | 1/2018 | Huang ................. G06Q 20/325 705/71 |

* cited by examiner

*Primary Examiner* — Josnel Jeudy
(74) *Attorney, Agent, or Firm* — Morris & Kamley LLP

(57) ABSTRACT

Systems and techniques are provided in which a token is used to manage user access to actions and features within an application platform. The token includes an indication of each action and/or feature to which the user has permission within the platform, thereby allowing for rapid and efficient development and management of user access to features within the platform.

26 Claims, 3 Drawing Sheets

AUTHENTICATION AND AUTHORIZATION USING TOKENS WITH ACTION IDENTIFICATION

BACKGROUND

As the use of online services and systems increases, accurate authentication and authorization of users is of increasing interest and importance. For example, it is often desirable for service providers to wish to ensure that users accessing resources such as applications, application features, content, and the like, are authorized to do so and are the specific user that each is claiming to be. To do so, service providers such as hosted applications often ask for credentials such as a username and password to verify a user's identity. In some cases, single sign-on (SSO) systems are used that allow users to authenticate once, such as by providing one username and password, and subsequently access multiple applications, systems, or the like, without being prompted or otherwise required to provide separate or additional credentials. In some cases, SSO systems are intended to reach across multiple services and/or multiple sources or providers of services, such as where a user provides credentials to a social networking application, which then allows the user to access any other services that have partnered with the social networking service and provide access based on the initial authentication to the social networking service. Similarly, one service may allow a user to authenticate using credentials managed by another service, such as where a gaming or news website allows a user to authenticate to the gaming website using social networking credentials.

Some conventional systems use a role-based system, for example by assigning roles such as Administrator, User, Guest, and the like to each user. This process ties the permissions to the implemented features of the application platform.

SUMMARY

Embodiments of the invention disclosed herein provide methods and systems for authenticating a permission of a user to access an action within a software application platform, that include receiving, from an application platform, a request to authenticate a user for access to an action within the application platform, the request including a token received from the user and an indication of an action to be performed by the user within the application platform, determining that the token includes an identification of the action as an action within the software application platform that the user has permission to perform, and based on the identification of the action as a permissible action, providing a response to the application platform indicating that the user is authorized to perform the action within the software application platform. The token may include a set of attributes of the token, a set of identifiers that indicate a plurality of actions within the software application platform that the user has permission to perform, and/or a first encryption of a combination of the set of attributes and the set of identifiers. The token may be validated, for example by generating a combination of the set of attributes of the token and the set of identifiers, encrypting the combination to generate a second encryption, and, upon determining that the second encryption is the same as the first encryption, validating the token. A software application platform as disclosed herein may include a hierarchical permission system. In some embodiments, the token may exclude any indication of a permission level of the user in the hierarchical permission system. The token may be generated in response to a request from the user, or in response to a request from another component of the system. A token as disclosed herein may be generated, for example, by obtaining a set of actions within the software application platform that the user has permission to perform within the software application platform, generating a list of identifiers of the set of actions, and generating an encryption of at least the list of identifiers. In some embodiments, a request from the user for the token may be received subsequent to an initial request sent by the user to the application platform to perform the action within the application platform. In some instances, it may be determined that the token should be refreshed, in which case a new version of the token may be generated and provided to the application platform in a response that is sent to the application platform. For example, the token may be refreshed based upon a determination that a new action is available within the application platform and that the user has permission to perform the new action within the application platform. As another example, the token may be refreshed based upon a determination that the user has permission to access an existing action within the application platform that the user previously did not have permission to access.

In an embodiment, a method for authenticating a permission of a user to access an action within a software application platform may include receiving, by an application platform, a first request from a user to perform an action within the application platform; determining, by the application platform, that the first request comprises a token; sending, by the application platform, a second request to an authentication service to validate the token and to verify that the user has permission to perform the action within the application platform, the second request comprising the token; validating the token by the authentication service; verifying by the authentication service, based upon the token, that the user has permission to perform the action within the application platform; providing a response by the authentication service to the application platform indicating that the user has permission to perform the action within the application platform; and performing the action by the application platform. Any of the features, combinations, and communications disclosed in other embodiments also may be used in conjunction with such an embodiment, and vice-versa.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
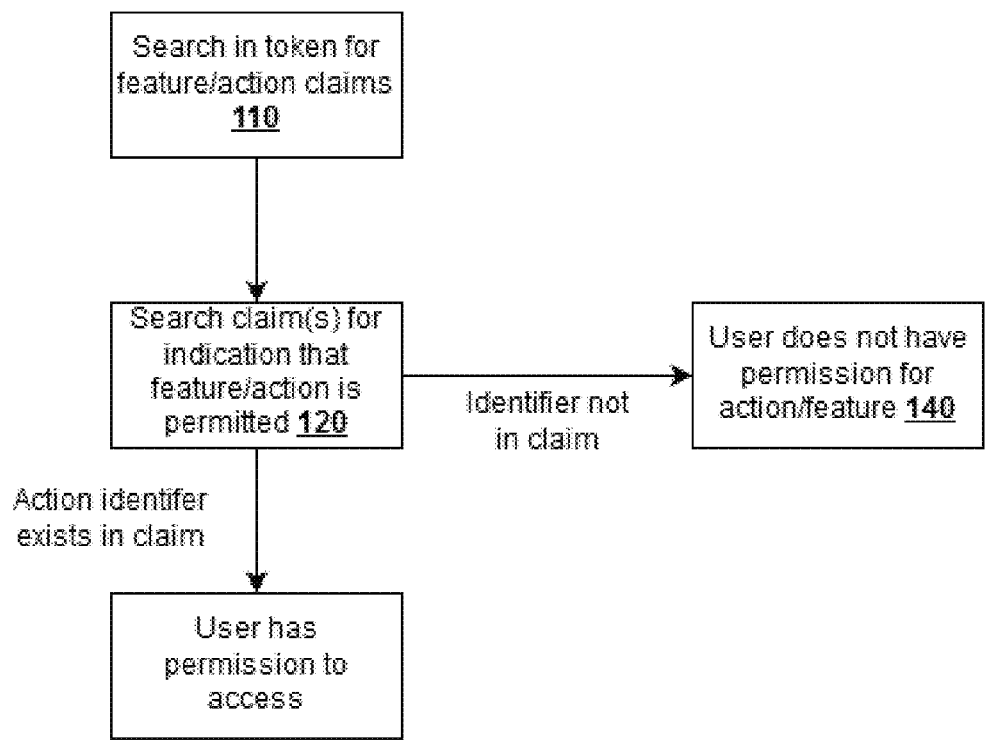
FIG. 1 shows an example process according to an embodiment of the invention.

As previously disclosed, service providers such as hosted applications often ask for credentials such as a username and password to verify a user's identity. In some cases, single sign-on (SSO) systems are used that allow users to authenticate once, such as by providing one username and password, and subsequently access multiple applications, systems, or the like, without being prompted or otherwise required to provide separate or additional credentials. In some cases, SSO systems are intended to reach across multiple services and/or multiple sources or providers of services, such as where a user provides credentials to a social networking application, which then allows the user to access any other services that have partnered with the social networking service and provide access based on the initial authentication to the social networking service. Similarly, one service may allow a user to authenticate using credentials managed by another service, such as where a gaming or news website allows a user to authenticate to the gaming website using social networking credentials.

For example, to authenticate a user a website may use an authentication interface provided by the social networking site, to which the user provides his credentials that were previously established with the social networking site. The interface sends the credentials to the social networking site, which authenticates the user and creates a token that identifies the user as an authenticated user and thereby verifies to the original site that the user is associated with that particular account at the social networking site. The token typically is provided to a token processing service operating on the original site, which allows the site to connect its own services to the user's social networking account.

Similarly, in non-SSO environments, it may be desirable to generate an authentication token once a user successfully verifies his identity with an authentication service. The token may simply identify the user, thereby preventing repeated authentication requests as the user accesses different functions, areas, or content within the site. In such an arrangement, the site or service may consult a lookup table or other database to determine whether the user has appropriate permission within the system to access the specific function, area, content, or the like. Alternatively, the token itself may include an indication of a permission level associated with the user or the user's account. For example, within a publishing application, a user with the "reviewer" permission level may be able to create new content, revise existing content, and review/approve content submitted by other users, whereas a user that has a lower "contributor" permission level may only be able to create new content and submit it for approval.

Alternatively, in either an SSO environment or a non-SSO environment, the user's permission level may be stored within the token itself. For example, the token may specifically indicate that the user has either the "reviewer" or "contributor" permission level, thus avoiding the need for an authentication service, or associated services in an SSO environment, to look up the user's permission level each time it needs to be known by the system to verify that a user is authorized to perform a particular function. Particular functions, areas, content, or the like still may be stored in a lookup table or other database, for example in SSO environments in which a single permission level or user may have access to different functionality at different sites or services.

Such token-based authentication and authorization systems and techniques generally are designed to meet many criteria. For example, in addition to typical concerns regarding security of the authentication system and generated tokens themselves, it typically is desirable for the system to be simple to use from a user perspective, while still providing a relatively high amount of flexibility to developers, sites and services that use the token.

Various systems and techniques have been proposed to provide user authentication, authorization, and/or access to various functionality within a system. For example, U.S. Pat. No. 7,865,931 describes a system including a web server, an application server, and a data server that is intended to protect web-based applications. When an application server receives a request, the application server extracts attributes of the request and uses an authorization engine to determine if attributes of the request are authorized by comparing each attribute with rules from a rules store in the data server. If the attributes of the request meet the rules in the rules store, then the request is executed by the application server. However, such a technique requires extensive communication between the various system components for each and every request processed by the system.

Similar systems may be used within a single service, such as where different users have different permissions within the service depending upon the user's permission level. In some cases, the permissions assigned to the user may depend at least in part upon the functionality that is available within the system, either to the system as a whole or to the particular user. For example, some systems allow for purchasers of the system to purchase functionality in different modules, thereby decreasing the cost and complexity of each particular installation of the system by providing only those modules that are applicable to the individual purchaser of the system. In this case, the functionality available by each permission level in the system is defined at least in part by the specific modules that are installed in the system. Each user's individual permission level also still defines what features are available to that particular user.

In some current conventional systems, communication and access to such a software platform and subsequent features of the software platform may be secured through a role-based permissions structure in which the role values are encoded within the token attached to the software communications. The token, in turn, may be encoded only with an identification of a particular role (or roles) available to the user, and not with the access permissions directly, as previously described. For example, when a new software application is implemented on such a software platform, the only form of access and permissions which are assigned to the application's workflows is user roles. Individual actions (i.e., functions available to users) are either assigned to existing roles, or new roles are created that contain the new functionality. This is in part due to tokens only containing roles to define the permissions of the token. The applied roles then are added to the security portion of the software application, and/or roles are redistributed from time to time.

For example, U.S. Pat. No. 8,336,078 describes a system in which each user is associated with a role, a policy type is associated with the role, and a role scope is associated with the role, and context parameters are associated with the user. When a request for access to a resource is received from a user, one or more actor-role scope values are determined based on the role scope and the values for the corresponding context parameters associated with the user. A response to the request is then determined based on the policy instance and the actor-role scope values.

Role-based systems also often incorporate a hierarchy of roles. For example, U.S. Patent Application Publication No. 2007/0214497 describes a role-based hierarchical access control system in which an access control list defines the types of access that a user may have to a resource, based on the role of the user. A hierarchy of roles is used in which one role inherits the permissions granted to another role to the resource. Access to the resource is then determined by comparing roles defined to have access privileges to the resource and the permissions granted to such roles to the role of a user seeking access to the resource.

Such role-based systems often suffer from unnecessary complexity when developing new functionality within an application that makes use of the role-based system.

For example, role changes typically require additional updates to the software application to redistribute roles utilized in the software application security from time to time. Such arrangements may be particularly cumbersome for developers to use when adding or modifying features within the software environment. Furthermore, in such a conventional system a new software application or application feature typically references a look-up data source to match permissions needed for the new application or feature to roles provided by a token, as previously disclosed. If a match is found, then communication and access to the new software application is allowed; otherwise communication and access to the new software application may be blocked and an error is sent back to the user making the communication or access request. Such techniques may be undesirably cumbersome due to the need to consult a lookup table or other database to identify features allowed for a particular role identified by a token.

Embodiments of the present invention provide systems and techniques that are usable by an action request processing system within a software environment for (1) providing identification of a requesting entity, (2) validating the identity of the requesting entity, and (3) confirming the requesting entity has the proper permissions to make a specific action request. As described in further detail below, these aspects may be accomplished through the use of a token associated with an authentication of the entity. The provided identification may accompany each request made by the requesting entity within the system. The identification in the request may be used to confirm the identification of the requesting entity and the permissions for the requested action. Accordingly, embodiments of the invention disclosed herein may enable identification, validation, and confirmation of permissions as desired, while requiring fewer and simpler communications among system components than conventional systems require, while still being relatively simple and accessible for developers that modify the system and/or create other applications and services that interface with the system.

In contrast to conventional techniques, embodiments disclosed herein remove user roles from the authentication and authorization process and instead uses a feature-action combination to define communication and access security across multiple applications within the software application. As used here, a service or software application "feature" refers to one or more actions which together define a common workflow or process. Similarly, an "action" refers to a sub-set of such a feature, which defines an individual step. Hence, a group of actions typically make up one feature, though in some cases a feature may have only a single action.

For example, in the context of a shipping application, tracking a shipment may be a feature, whereas retrieving a current package status and retrieving a package history are two separate actions that may make up, at least in part, the shipment tracking feature.

The definition of specific actions and features may be done within the software application security layer during initial development. Subsequently, the software platform security layer may simply add an indication that a user has access to particular actions and/or features during the token generation process as needed, based on the user credentials provided during authentication. This may minimize, reduce, or eliminate conventional testing routes and re-passes over the software application to keep security credentials in sync when new actions and features are added to the software, thereby reducing development overhead while maintaining a relatively simple interface from an end-user perspective.

Embodiments disclosed herein may be used in software platforms and environments that use a hierarchical permission system, in which the platform is configured to determine if a user has permission of at least a minimum level to access a particular action or feature before providing access to that action or feature. In contrast, non-hierarchical systems may determine whether a user has permission to access each individual action or feature. For example, a non-hierarchical system may be modeled as a comprehensive list of all actions or features available within the system. Each user account then either has access to the action or feature, or does not have access to the action or feature. In a hierarchical system, the actions or features may be arranged in a hierarchy with multiple levels. Each user account then has permission to access a particular level of the hierarchy. The user is given access to each action or feature on the user's permission level, as well as all actions and features of all lower-permission levels.

In embodiments disclosed herein, each token created upon user authentication may list each feature the user is allowed to access. Thus, as previously disclosed, embodiments of the invention may allow for tokens to be updated when new features are added to the system without requiring any modification to existing user roles. Existing tokens may be updated whenever new features become available, with existing tokens being refreshed with new tokens. Expired or to-be-replaced tokens may be refreshed based upon the existing token, or by requiring a conventional credential check of the user such as a username/password combination, RSA or other hardware token, or the like.

A token as disclosed herein may be issued to services at time of deployment and to users following a secondary validation of the user's identity, such as by way of a user name and password, hardware token, or the like. Once the token has been issued, subsequent action requests are expected to have the token in the authorization header of any communication, which may be processed via an application program interface (API). Other means of communication within the system may receive the token as a parameter of the action request. On subsequent action request which have the token as part of the communication, the token may be used to validate whether the action request is valid based on the permissions stored in the second data set of the token.

The API service may issue and validate tokens and the permissions in the tokens as disclosed herein. For example, identification tokens may include a set of three sets of data in JavaScript object notation (JSON) or other notation, stored in string format and encoded based on a predefined encoding schema. The three sets of data may include a summary of the token attributes encoded into an ordered set of characters, a set of claims detailing the user's identification and permissions associated with the token encoded into an ordered set of characters, and an ordered of characters resulting from running encoding the two sets of characters with a one-way encryption algorithm utilizing a key known only to the host system. The three ordered sets of characters may then be returned to a requestor as a single set of characters separated by a dividing character, or otherwise serialized in a response provided to the user. For example, when a user attempts to access to a particular action, feature, or system, the system may send a request to the API an receive back the serialized response. The requesting system may then use this response to determine if the user should be granted access to the action, feature, or system.

Other services within an enterprise application platform may use the API or a related service to manage token validation. In some embodiments, token validation may be performed to confirm that the claims regarding the user's access permissions in the second data set of the token are still relevant at the time of the action request. Validation of the token may be performed, for example, by re-generating the third set of data in the token from the first two ordered sets of characters from the token. The generated ordered set of characters then may be compared to the third ordered set of characters in the token. If the ordered sets match, then the token is considered validated and the second ordered set of characters is decoded back to a data set. The claims in the data set are then searched to validate the token carries the needed permissions to process the action request.

A search for user permissions as disclosed herein may be performed in two parts, as shown in FIG. 1. First, at 110 the system may search for a claim identifying a feature in the second data set of the token, i.e., an indication in the token that the feature is permissible for the user to perform within the application platform. If such the claim is found, the value of the claim may be, for example, a collection of numbers representing an identification of the actions of the feature that the token may validate for processing. At 120, the collection of numbers in the claim value may be searched to determine whether the identifying number for the action in the action request is part of the collection of numbers in the feature claim of the token's second data set. That is, the system may determine if an action or feature that a user is attempting to access is listed in the collection of allowed actions in the token that was generated for the user. If the identifying number of the action exists in the collection of numbers in the token, then the token (and thus the user) is deemed to have sufficient permissions to process the action request. If the identifying number is not found in the collection of numbers, at 140 the token—and therefore the user—is deemed to have insufficient permissions to process the action request. The authentication service may then communicate to the requesting service or other requestor an indication of whether the token is valid or invalid for the specific action or feature request.

Figure 2:
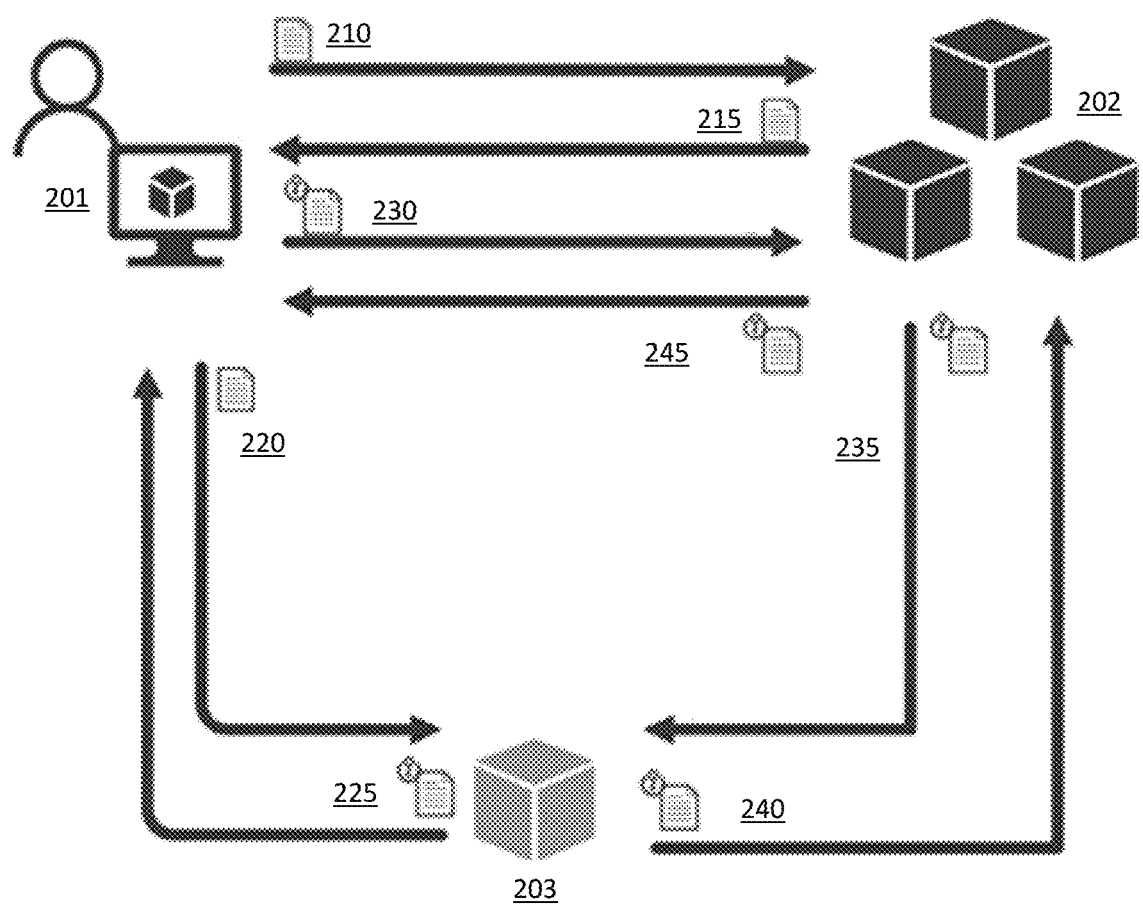
FIG. 2 shows an example process of authenticating a user by an authentication service according to an embodiment of the invention.

FIG. 2 shows an example of a use case according to an embodiment disclosed herein. In this example, a user/application 201 accesses a service, application platform, or similar environment 202. The platform 202 may include an authorization support service or similar system 203, which may include an API as previously disclosed. At 210, the user or application 201 makes an initial action request 210 to the application platform 202. Such a request may be generated, for example, when the user 201 attempts to access an action or feature within a service provided by the platform 202.

At 215, the platform 202 may determine that the action request 210 does not contain a token. As previously disclosed, within embodiments disclosed herein it may be presumed that, once a token has been generated for a particular user or other entity, any requests associated with that user will include the token generated for the user. Because the request 210 does not include the token, the platform 202 may respond with an error response 215 noting the absence of a token in the action request. The response also may provide information on how to contact an authorization service 203 to obtain the token, such as by providing a secondary set of credentials to the service 203 as previously disclosed. The authorization service 203 is shown as a separate entity from the platform 202 for ease of illustration. However, it will be understood by one of skill in the art that the service 203 may be integrated with and/or implemented on a common system with the application platform 202.

At 220, the user 201 may submit a secondary set of credentials to the authentication service 203. As previously disclosed, the credentials may be a username and password, hardware token, or any other suitable credential. The service 203 may validate the secondary credentials using any suitable technique. In general, the type, use, validation, and management of such credentials may be performed using any known techniques. The secondary credentials are separate from and independent of the tokens disclosed herein. Accordingly, any known credentialing systems may be used without deviating from the scope and content of the invention as disclosed herein.

After validating the user's secondary credentials, the authentication service 203 may generate a token as previously disclosed. The token may include identifying information of the user, an indication of permissions that the user has within the application platform 202 or one or more services or applications provided by the application platform 202, and validation data as previously disclosed. The service 203 then may send a response to the user 201 at 225 that included the generated token.

In some embodiments, the authentication service 203 may be specific to the application platform 202. That is, the service 203 may generate tokens only suitable for use with the application platform 202 and/or specific applications or services provided by the platform 202 to the user 201. Alternatively, the service 203 may provide tokens that can be used in conjunction with multiple application platforms 202, or the tokens generated by the service 203 may be used by multiple platforms 202. For example, the authentication service may provide SSO-type functionality for multiple application platforms or services 202 as previously disclosed.

At 230, the user 201 may re-submit the original action request and the token received from the authentication service 203. For example, the token may be included in the header of the request 203. The token and/or the request may be serialized as previously disclosed or, more generally, it may be included in the request in any suitable format. As with the previous request 210, the platform 202 first may determine whether the request 230 includes a token generated by the authentication service 203. In this case, the platform 202 identifies the token in the request 230 and, in response, may initiate authorization of the action request against the token.

To authorize the request, the platform 202 may send a token validation request to the authentication service 203 to validate the token permissions for a specific feature and/or action of the feature at 235. In some cases, only the action may be provided to the service 203, while in others a combination of the overall feature and a particular action or actions may be provided in the request.

The authentication service may then authorize the token. As previously disclosed, token authorization may be performed by first validating the token as a valid token by regenerating the third ordered set of characters from the submitted token and comparing the regenerated ordered set of characters against the third ordered set of characters from the submitted token. If the ordered sets of characters match, then the service may check an additional standard claim within the token to confirm that the token has not expired and thus should be invalidated. If the token is invalidated in any way, i.e., the token either fails to validate or is expired, the service 203 may return an error to the platform 202 as a response to the action request.

The authentication service also may check the standard claim to determine if a fresh token should be generated prior to authorizing the token, for example because the token has not expired but the system indicates that it should be refreshed. As a specific example, as previously disclosed it may be desirable to refresh existing tokens when new actions and/or features are available in the platform 202, or periodically regardless of the expiration status of the token. If the token is to be refreshed but the token's authenticity is still valid, then a refreshed token is generated and will returned to the platform 202 as part of the response 240. The refreshed token also may take the place of the submitted token for the final step of authorizing the action request based on the token permissions.

The authentication service 203 may then determine whether the user 201 is authorized to access the feature or action being requested. For example, the service 203 may parse an identifying string of the feature and action from the validation request 235. Then, using the identifying string for the feature, determine whether the token includes a claim matching the identifying string in the second ordered set of characters in the token. Notably, this information is included in the token itself as previously disclosed, and there is no need for the service 203 to consult a separate database of permissions. If the claim is found in the token, then the collection of identifying strings for actions in the claim's value may be compared to the submitted identifying string for the action in the validation request. If the identifying strings for the feature and/or action are not found, the service 203 may return a relevant error to the platform 202 as a response 240 to the action request. If both the identifying strings for the feature and action are found in the second ordered set of characters of the token, then an acknowledgement of the action authorization is sent as a response 240 from the service 203 along with the token, which may have been refreshed, to the platform 202.

At 245, if the response 240 from the service 203 is or includes an error, then the platform 202 may reply to the action request with a corresponding error. If the response 240 from the service 203 was an acknowledgement of the token's authorization of the action requested at 230, then the platform 202 may perform the requested action and return any suitable response to the requested action, as well as the token. If the token was refreshed by the authentication service 203 as previously disclosed, the refreshed token may be included in the response 245.

In the example of FIG. 2, it is presumed that the user 201 does not already have a token at the time of an initial request, although it will be understood that a similar process may be performed once an initial token has already been generated for the user prior to a request to access a feature or action. For example, communications 210, 215 may not occur if the initial request includes a token, such as at 230.

Furthermore, as previously disclosed, the service 203 and platform 202 may be implemented on a common system, or may be integrated such that the user/application 201 does not discern a difference between the two. Accordingly, in some embodiments, some communications shown between the user 201 and the service 203, or between the platform 202 and the service 203, may be combined or omitted as appropriate for a particular architecture.

Embodiments disclosed herein may prevent new features from being accessed ahead of time because the data corresponding to the token permissions can be deployed independent of the feature itself. For example, the claims and permissions previously disclosed with respect to the token may be added to new and refreshed tokens before the corresponding actions and features have been implemented in a software platform such as the platform 202 in FIG. 2. Embodiments disclosed herein also prevent additional development overhead such as a requirement to add roles to further distinguish groups of users before rolling out a feature, or giving a sub-group of a given role unwanted access to a given feature while roles are adjusted post roll-out. This also allows for rollouts to users to be independent of the feature rollout itself. This allows for features such as providing a user with access to a feature only after they have completed training related to the feature.

To further contrast the present invention to conventional techniques, it may be useful to consider how a new feature may be added to a software platform, such as platform 202 described with respect to FIG. 2, in a conventional system and in an embodiment as disclosed herein.

When a new feature is planned for development in a conventional system, particularly a role-based and/or hierarchical permission system, role assignments are assigned to feature functionalities during planning and passed to the developer during development of the feature. For example, the new feature may require a new role to be created if no existing roles are suitable for the feature, or one or more existing features may need to be updated to include the new feature. Typically, many users will already have been assigned to existing roles that may need to be updated to account for the new feature. Accordingly, end-user parties that administer user permissions and feature development must coordinate these assignments on a regular basis. Furthermore, the creation and/or updating of roles as well as re-assignment of roles as needed must be scheduled to occur in tandem with the deployment of the new feature, for example to prevent unintentional access of the feature by users before the roles have been properly updated or created.

As feature development progresses; the addition, alterations, and removal of feature functionality typically requires multiple reviews and alterations to role assignments both to the feature functionality and user permissions and/or accounts. This will involve additional coordination to ensure changes in role assignments to not suddenly allow unwanted users access to the feature functionality. Users with newly assigned roles will also have to be reviewed across role access on existing feature functionality to ensure a user is not given unintentional or unwanted access to any existing features to which the user should not have permission.

Once feature development is complete and deployment is ready, both the deployment of the feature and the update of the user role permissions determined during the planning stage and updated throughout development must be coordinated between developers and end users. Failure to coordinate may result in unintended feature access for those parts of the feature functionality which use existing roles for authorization. Once the feature has been deployed and user role updates are confirmed, the feature rollout would be considered complete.

In contrast, according to embodiments disclosed herein, when a new feature is planned for development, the feature may be assigned a feature identifier and the various feature functionalities may be assigned one or more separate action identifiers. Developers may then provide appropriate assignment documentation to the end users or other parties responsible for user administration and begin feature development. The parties responsible for user administration can separately begin to review which users will have the feature and/or action identifiers added to their permissions. No initial coordination is required, which may significantly simplify and shorten development time in comparison to conventional techniques.

As feature development progresses; the addition and removal of feature functionality may result in additions and removals to the documentation for the feature and action identifiers. However, alterations to the feature functionality will only require updates to the documentation related to the specific identifier or identifiers associated with the altered functionality. Accordingly, although parties responsible for user administration may be notified of the updates so that they can in turn update their user updates accordingly, no persistent coordination is needed. By default, users may not have access to feature functionality without explicit assignment of the identifiers being added to the permissions claims in generated tokens as previously disclosed. Again, this may significantly simplify and shorten development time and reduce user management overhead.

Once feature development is complete and deployment is ready, the developer may deploy the new feature with the additional identifiers being added only to the permissions for a test user/account. The feature deployment can then be tested and confirmed functional. Individual user assignment of the identifiers may be updated as users are needed for testing, as they complete training, or by any set of conditions deemed necessary. Unlike in conventional systems, there is no need to coordinate feature deployment and user updates. The user does not have permissions to the feature by default, and there is no implicit access within the identifiers. Failure to coordinate would mean no user/account has access to the feature functionality, thereby avoiding unintended user access to new features. Once the feature is deployed and a procedure is in place to update user feature action assignments, the feature rollout would be considered complete.

Figure 3:
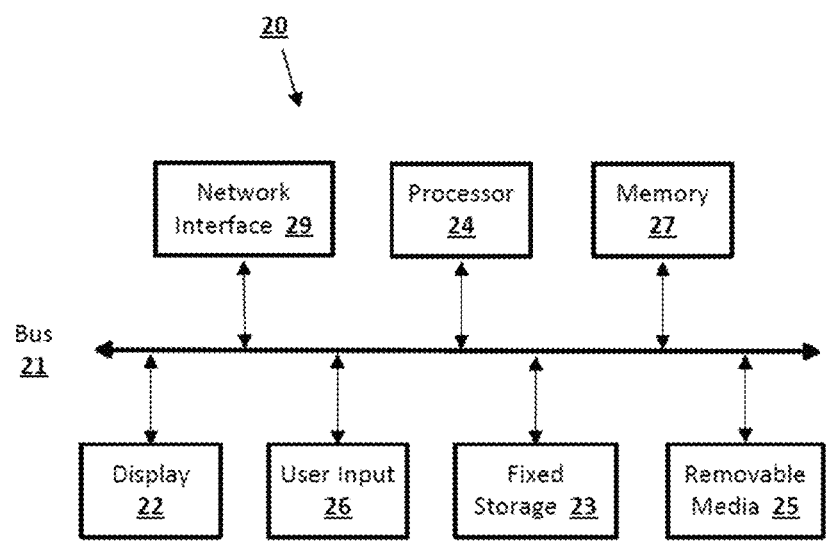
FIG. 3 shows a computer architecture suitable for implementation of embodiments of the invention.

Embodiments of the invention may be implemented in and used with a variety of component and network architectures. FIG. 3 is an example computing device 20 suitable for implementing embodiments of the presently disclosed subject matter, for example a computerized software application platform 202 as shown in FIG. 2, and/or a computerized authorization system 203 as shown in FIG. 2. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
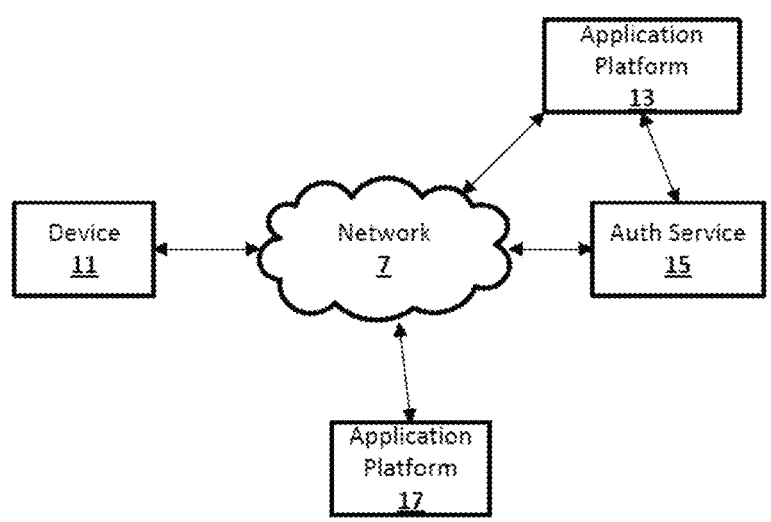
FIG. 4 shows an example distributed computing system suitable for implementation of embodiments of the invention.

FIG. 4 shows an example network arrangement according to an embodiment of the disclosed subject matter. One or more devices 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as an application platform 13 and/or authentication service as previously disclosed, for example with respect to FIG. 2. The remote devices may be directly accessible by the user device 11, or one or more other devices may provide intermediary access. The device 11 also may access other remote platforms 17 or services provided by remote platforms 17 such as cloud computing arrangements and services. The application platform 13, 17 may include one or more servers and/or databases, as will be readily understood by one of skill in the art. As previously disclosed, in some embodiments an application platform 13 may communicate directly with, or be integral with the authentication service 15, such as where both components are implemented on a common computer system. Furthermore, the application platform 13 and/or authentication service 15 may be remote from the user device 11, or one or both may be local, such as where an end user accesses a locally-installed application platform 13 that includes an authentication service or equivalent service.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine-readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for authenticating a permission of a user to access an action within a software application platform, the method comprising:
   receiving, from an application platform, a request to authenticate a user for access to an action within the application platform, the request including a token received from the user and an indication of an action to be performed by the user within the application platform;
   determining that the token includes an identification of the action as an action within the software application platform that the user has permission to perform;
   based on the identification of the action as a permissible action, providing a response to the application platform indicating that the user is authorized to perform the action within the software application platform;
   determining that the token should be refreshed because the user has access to an additional action to which the user previously did not have access; and
   generating a new version of the token by:
      obtaining a set of actions within the software application platform that the user has permission to perform within the software application, including the additional feature;
      generating a list of identifiers of the set of actions; and
      generating an encryption of at least the list of identifiers.

2. The method of claim 1, wherein the token comprises:
   a set of attributes of the token;
   a set of identifiers that indicate a plurality of actions within the software application platform that the user has permission to perform; and
   a first encryption of a combination of the set of attributes and the set of identifiers.

3. The method of claim 2, further comprising validating the token.

4. The method of claim 3, wherein validating the token comprises:
   generating a combination of the set of attributes of the token and the set of identifiers;
   encrypting the combination to generate a second encryption; and
   upon determining that the second encryption is the same as the first encryption, validating the token.

5. The method of claim 1, wherein the software application platform comprises a hierarchical permission system, and the token excludes any indication of a permission level of the user in the hierarchical permission system.

6. The method of claim 1, further comprising:
   receiving a request from the user for the token; and
   generating the token.

7. The method of claim 6, wherein generating the token comprises, prior to generating the new version of the token:
   obtaining an initial set of actions within the software application platform that the user has permission to perform within the software application platform, the initial set of actions excluding the additional action;
   generating a list of identifiers of the initial set of actions; and
   generating an encryption of at least the list of identifiers of the initial set of actions.

8. The method of claim 6, wherein the request from the user for the token is received subsequent to an initial request sent by the user to the application platform to perform the action within the application platform.

9. The method of claim 1, wherein the request comprises the token in the header of the request.

10. The method of claim 9, wherein the token is serialized in the header of the request.

11. The method of claim 1, wherein the additional action is a new action available within the application platform that was not previously available within the application platform.

12. The method of claim 1, wherein the additional action is an existing action within the application platform that the user has permission to access but which user previously did not have permission to access.

13. A method for authenticating a permission of a user to access an action within a software application platform, the method comprising:
- receiving, by an application platform, a first request from a user to perform an action within the application platform;
- determining, by the application platform, that the first request comprises a token;
- sending, by the application platform, a second request to an authentication service to validate the token and to verify that the user has permission to perform the action within the application platform, the second request comprising the token;
- validating the token by the authentication service;
- verifying by the authentication service, based upon the token, that the user has permission to perform the action within the application platform;
- providing a response by the authentication service to the application platform indicating that the user has permission to perform the action within the application platform;
- performing the action by the application platform;
- determining, by the application platform or the authentication service, that the token should be refreshed because the user has access to an additional action to which the user previously did not have access; and
- generating a new version of the token by:
  - providing, to the authentication service, a set of actions within the software application platform that the user has permission to perform within the software application, including the additional feature;
  - generating, by the authentication service, a list of identifiers of the set of actions; and
  - generating, by the authentication service, an encryption of at least the list of identifiers.

14. The method of claim 13, wherein the token comprises:
a set of attributes of the token;
a set of identifiers that indicate a plurality of actions within the software application platform that the user has permission to perform; and
a first encryption of a combination of the set of attributes and the set of identifiers.

15. The method of claim 14, wherein validating the token comprises, by the authentication service:
- generating a combination of the set of attributes of the token and the set of identifiers;
- encrypting the combination to generate a second encryption; and
- upon determining that the second encryption is the same as the first encryption, validating the token.

16. The method of claim 13, wherein the software application platform comprises a hierarchical permission system, and the token excludes any indication of a permission level of the user in the hierarchical permission system.

17. The method of claim 13, further comprising:
- receiving, by the authentication service, a request from the user for the token;
- generating the token by the authentication service; and
- providing the token from the authentication service to the user.

18. The method of claim 13, wherein generating the token comprises, prior to generating the new version of the token:
- obtaining an initial set of actions within the software application platform that the user has permission to perform within the software application platform, the initial set of actions excluding the additional action;
- generating a list of identifiers of the initial set of actions; and
- generating an encryption of at least the list of identifiers of the initial set of actions.

19. A system for authenticating a permission of a user to access an action within a software application platform, the system comprising:
- a computerized software application platform to receive a first request from a user to perform an action within the application platform, determine that the first request comprises a token, and
- a computerized authentication service provider comprising at least one hardware processor configured to validate a token received from the computerized application platform, verify, based upon the token, that the user has permission to perform the action within the application platform, and provide a response to the application platform indicating that the user has permission to perform the action within the application platform;
- wherein the computerized software application platform sends a second request to the authentication system to validate the token and to verify that the user has permission to perform the action within the computerized software application platform, the second request comprising the token, and the computerized software application platform performs the action subsequent to receiving the response from the computerized authentication system, and
- wherein, based upon a determination that the token should be refreshed because the user has access to an additional action to which the user previously did not have access, the authentication system generates a new version of the token by:
  - obtaining a set of actions within the software application platform that the user has permission to perform within the software application, including the additional feature;
  - generating a list of identifiers of the set of actions; and
  - generating an encryption of at least the list of identifiers.

20. The system of claim 19, wherein the token comprises:
a set of attributes of the token;
a set of identifiers that indicate a plurality of actions within the software application platform that the user has permission to perform; and
a first encryption of a combination of the set of attributes and the set of identifiers.

21. The system of claim 20, wherein validating the token comprises:
- generating a combination of the set of attributes of the token and the set of identifiers;
- encrypting the combination to generate a second encryption; and
- upon determining that the second encryption is the same as the first encryption, validating the token.

22. The system of claim 19, wherein the computerized software application platform comprises a hierarchical permission system, and the token excludes any indication of a permission level of the user in the hierarchical permission system.

23. The system of claim 22, wherein generating the token comprises, prior to generating the new version of the token:

obtaining an initial set of actions within the software application platform that the user has permission to perform within the software application platform, the initial set of actions excluding the additional action;

generating a list of identifiers of the initial set of actions; and generating an encryption of at least the list of identifiers of the initial set of actions.

24. The system of claim 19, wherein the computerized authentication system receives a request from the user for the token, the computerized authentication system generates the token, and the token is provided from the computerized authentication system to the user.

25. A non-transitory computer-readable medium storing a plurality of instructions which, when executed by a processor, perform a method for authenticating a permission of a user to access an action within a software application platform, the method comprising:

receiving, from an application platform, a request to authenticate a user for access to an action within the application platform, the request including a token received from the user and an indication of an action to be performed by the user within the application platform;

determining that the token includes an identification of the action as an action within the software application platform that the user has permission to perform;

based on the identification of the action as a permissible action, providing a response to the application platform indicating that the user is authorized to perform the action within the software application platform;

determining that the token should be refreshed because the user has access to an additional action to which the user previously did not have access; and generating a new version of the token by:

obtaining a set of actions within the software application platform that the user has permission to perform within the software application, including the additional feature;

generating a list of identifiers of the set of actions; and generating an encryption of at least the list of identifiers.

26. A non-transitory computer-readable medium storing a plurality of instructions which, when executed by a processor, perform a method for authenticating a permission of a user to access an action within a software application platform, the method comprising:

receiving, by an application platform, a first request from a user to perform an action within the application platform;

determining, by the application platform, that the first request comprises a token;

sending, by the application platform, a second request to an authentication service to validate the token and to verify that the user has permission to perform the action within the application platform, the second request comprising the token;

validating the token by the authentication service;

verifying by the authentication service, based upon the token, that the user has permission to perform the action within the application platform;

providing a response by the authentication service to the application platform indicating that the user has permission to perform the action within the application platform;

performing the action by the application platform, determining, by the application platform or the authentication service, that the token should be refreshed because the user has access to an additional action to which the user previously did not have access; and generating a new version of the token by:

providing, to the authentication service, a set of actions within the software application platform that the user has permission to perform within the software application, including the additional feature;

generating, by the authentication service, a list of identifiers of the set of actions; and generating, by the authentication service, an encryption of at least the list of identifiers.

* * * * *